UNITED STATES PATENT OFFICE 2,010,409

METHOD OF TREATING WELLS

Irving E. Muskat, Pittsburgh, Pa., assignor to Gulf Research & Development Corporation, Wilmington, Del., a corporation of Delaware No Drawing. Application November 27, 1934,
Serial No. 755,061

6 Claims. (Cl. 166—21)

This invention relates to methods of treating wells; and it comprises a method of treating wells having oil and water formations penetrated by the well and delivering thereinto, for plugging the water formation without affecting permeability of the oil formation, wherein sulfur dioxid is pumped into the well and the adjacent formations to a considerable distance, the sulfur dioxid dissolving in water in the water formations and forming sulfurous acid, the well is allowed to flow until oil appears so as to free the oil formation of sulfur dioxid while leaving most of the sulfurous acid in the water formation, water is forced into the well to drive the sulfurous acid back into the water formation, and hydrogen sulfid or sodium sulfid solution is forced into the well and into the formations, reacting with the sulfurous acid to form sulfur in situ in the interstices of the water formation to plug them, the steps of injecting sulfur dioxid and of injecting the sulfid being sometimes carried out in reverse order; all as more fully hereinafter set forth and as claimed.

In oil wells, the oil producing formations are often associated with water bearing formations closely adjacent the oil formations and delivering into the well at approximately the same level. Many methods have been proposed for shutting off or reducing flow of water into a well but in many cases attempts to shut off the water result in a simultaneous reduction of the oil flow.

According to the present invention I provide an improved method for plugging or shutting off the water formation without substantially affecting flow from the oil formation. I do this by precipitating sulfur in the water formation under conditions such that no sulfur is precipitated in the oil formation. I do this by injecting into the well separately two reagents in solution or in gaseous form, which react in the presence of water to throw down sulfur. Sulfur dioxid in liquid or gaseous form or in water solution and a sulfid such as hydrogen sulfid gas or sodium sulfid solution are suitable reagents for my purposes.

According to a good embodiment of this invention I pump liquid sulfur dioxid into the well and force it into the adjacent oil and water formations to a considerable distance. The sulfur dioxid penetrates and dissolves in the water occurring in the water formations and forms some sulfurous acid. It also penetrates into the oil formation, but to a much less extent than in the water formation. The pressure is released and the well is allowed to flow until oil appears. This frees the oil formation of sulfur dioxid but leaves a substantial proportion of sulfur dioxid and sulfurous acid remaining in the water formation. Then water is forced into the well under pressure to drive the sulfurous acid back into the water formation as far as desirable. The practical limit is reached when the pumping pressure rises to a high value. Hydrogen sulfid in gaseous form or mixed with water, or a solution of a sulfid such as sodium sulfid is forced into the well under high pressure. Reaction takes place with the sulfurous acid in the water formation forming solid sulfur in the interstices of the water formation, effectively plugging them. Since the oil formation has been cleared of sulfur dioxid, no deposition of sulfur takes place therein. When calcium carbonate occurs in the water-bearing formation, as is often the case, reaction takes place with the sulfurous acid with the formation of insoluble acid calcium sulfite. This product aids in plugging the water formation.

In come cases it is convenient to reverse the order of steps. For example the hydrogen sulfid gas or the sodium sulfid solution can be forced into the formations first, the well allowed to flow and the well water containing sulfid solution or hydrogen sulfid gas forced back into the formation, and then sulfur dioxid pumped in. Sulfur is deposited in the same way as in the first alternative.

In a specific embodiment of the invention a well producing oil and water at approximately the same level is treated for differentially shutting off the water flow. A charge of 500 pounds of liquid sulfur dioxid is pumped down the well and into the formations. The well is allowed to flow until oil appears, to free the oil formation of sulfur dioxid. Water is forced into the well, to drive the well water containing sulfurous acid far back into the water formation. A charge of 100 pounds sodium sulfid dissolved in 2000 gallons water is then forced into the well under high pump pressure. After a while pressure is released and the well allowed to produce. The water flow is generally substantially stopped.

In another specific embodiment of the invention a well having oil and water sands closely associated is treated to plug the water sands. A batch of 500 pounds hydrogen sulfid gas is pumped into the well under high pressure. The well is allowed to flow until oil appears. Water is forced into the well under high pressure to force the hydrogen sulfid containing water back as far as possible, and then 100 pounds liquid sulfur dioxid is pumped into the well and surrounding formations. After a time pressure is released and the well allowed to produce. The amount of water coming out with the oil is substantially reduced.

The agents useful in my process are cheap, readily available and conveniently shipped. Sulfur dioxid and hydrogen sulfid are conveniently provided in pressure cylinders of conventional type. The reagents are relatively mild and cause negligible corrosion of metallic parts.

What I claim is:—

1. A method of treating wells having oil and water formations adjacent the well for plugging the water formation without affecting permeability of the oil formation, wherein two reagents are forced into the well consecutively, the reagents being capable of reacting in the presence of water to give sulfur, the well being allowed to flow after the injection of the first reagent and before the injection of the second reagent to clear the oil formation of the first injected reagent.

2. A method of treating wells having oil and water formations adjacent the well and delivering thereinto, for plugging the water formation without plugging the oil formation, wherein two reagents capable of reacting in the presence of water to form sulfur are forced consecutively into the well and surrounding formations, the well being allowed to flow after the injection of the first reagent to free the oil formation and liquid being forced into the well after the flowing step and before the injection of the second reagent, to drive the first injected reagent back into the water formation.

3. A method of treating wells having oil and water formations adjacent the well and delivering thereinto, for plugging the water formation without plugging the oil formation, wherein sulfur dioxid is pumped into the well and the adjacent formations, dissolving in the water and forming some sulfurous acid, and a sulfid is injected into the formations, reacting with the sulfurous acid to deposit solid sulfur in the water formation.

4. A method of treating wells having oil and water formations adjacent the well and delivering thereinto for plugging the water formation without plugging the oil formation, wherein sulfur dioxid is pumped into the well and the adjacent formations, the well is allowed to flow to free the oil formation of sulfur dioxid, liquid is forced into the well to drive the dissolved sulfur dioxid back into the water formation and a sulfid is forced into the well and adjacent formations reacting with the dissolved sulfur dioxid in the water formation to deposit solid sulfur therein.

5. The matter of claim 1 wherein one of the reagents is sulfur dioxid and the other reagent is hydrogen sulfid.

6. The matter of claim 1 wherein one of the reagents is sulfur dioxid and the other reagent is an aqueous sulfid solution.

IRVING E. MUSKAT.